United States Patent
Gazdzinski

[19]
[11] Patent Number: 5,902,962
[45] Date of Patent: May 11, 1999

[54] CABLE AND METHOD OF MONITORING CABLE AGING

[76] Inventor: Robert F. Gazdzinski, 5862D Mission Center Rd., San Diego, Calif. 92123

[21] Appl. No.: 08/842,613

[22] Filed: Apr. 15, 1997

[51] Int. Cl.$^6$ .................................................. H01B 17/22
[52] U.S. Cl. ............................... 174/113 R; 174/117 AS; 340/605; 73/866
[58] Field of Search .................. 174/113 R, 113 AS, 174/116, 117 F, 117 AS; 73/40.5 R, 86, 866; 340/605

[56] References Cited

U.S. PATENT DOCUMENTS

| | | | |
|---|---|---|---|
| 4,006,289 | 2/1977 | Roe et al. | 174/102 R |
| 4,365,865 | 12/1982 | Stiles | 174/70 R X |
| 4,736,978 | 4/1988 | Cielker | 294/90 |
| 4,777,325 | 10/1988 | Siwinski | 174/113 AS X |
| 4,780,574 | 10/1988 | Neuroth | 174/102 D |
| 5,132,488 | 7/1992 | Tessier et al. | 174/113 R X |
| 5,174,164 | 12/1992 | Wilheim | 73/866.5 |
| 5,266,743 | 11/1993 | Helbawi | 174/93 |

OTHER PUBLICATIONS

Toman, G. and R.F. Gazdzinski, "Evalution of Cable Polymer Aging Through Indenter Testing of In–Plant and Laboratory–Aged Specimens," EPRI TR–104075. Electric Power Research Inst., Jan. 1996 (pertinent portions annotated).

Gazdzinski, R.F., et al, "Aging Management Guideline for Commercial Nuclear Power Plants—Electrical Cable and Terminations," SAND96–0344, U.S. DOE/Sandia National Laboratories, Sep. 1996.

*Primary Examiner*—Kristine Kincaid
*Assistant Examiner*—William H. Mayo

[57] ABSTRACT

A cable and method of monitoring the aging of critical cable components in-situ. The cable includes a specimen element which is located in proximity to the individual conductors of the cable. The cable and specimen element are exposed to similar aging stressors, and the aging of the specimen element is analyzed to estimate the aging of the installed cable in a completely non-destructive manner.

15 Claims, 13 Drawing Sheets

CABLE AND METHOD OF MONITORING CABLE AGING

BACKGROUND OF THE INVENTION

1. Field of the Invention

The present invention relates to the field of electrical and optical cable, specifically to the in-situ monitoring of aging of various cable components.

2. Description of Related Technology

The aging of power, control, instrumentation, and data transmission cable is of considerable importance to, among others, industrial and electrical power plant operators in that the unanticipated failure of such cables may have significant adverse effects on plant operation and maintenance (O&M) costs and downtime. Electrical and optical cables have traditionally been considered long-lived components which merit little in the way of preventive maintenance or condition monitoring due to their generally high level of reliability and simplicity of construction. Like all other components, however, such cables age as the result of operational and environmental stressors. These stressors may include heat, mechanical stress, chemicals, moisture, nuclear radiation, and electrical stress. Furthermore, the presence of oxygen and contaminants, while not directly resulting in component degradation, may exacerbate the effects of the aforementioned stressors and accelerate the deterioration of various cable components. Aging effects may be spatially generalized (i.e., affecting most or all portions of a given cable equally, such as for a cable located completely within a single room of uniform temperature), or localized (i.e., affecting only very limited portions of a cable, such as in the case of a cable routed near a highly localized heat source). The severity of these aging effects depends on several factors including the severity of the stressor, the materials of construction and design of the cable, and the ambient environment surrounding the cable. Detailed discussions of electrical cable aging may be found in a number of publications including SAND96-0344 "Aging Management Guideline for Commercial Nuclear Power Plants—Electrical Cable and Terminations" prepared by Sandia National Laboratories/U.S. Department of Energy, September 1996. Discussions regarding optical cable aging may be found, inter alia, in Electric Power Research Institute (EPRI) publications and telecommunications industry literature. The following description will be limited to electrical cable, although it can be appreciated that the principles of aging and analysis described herein may also be largely applicable to optical cabling.

Figure 1:
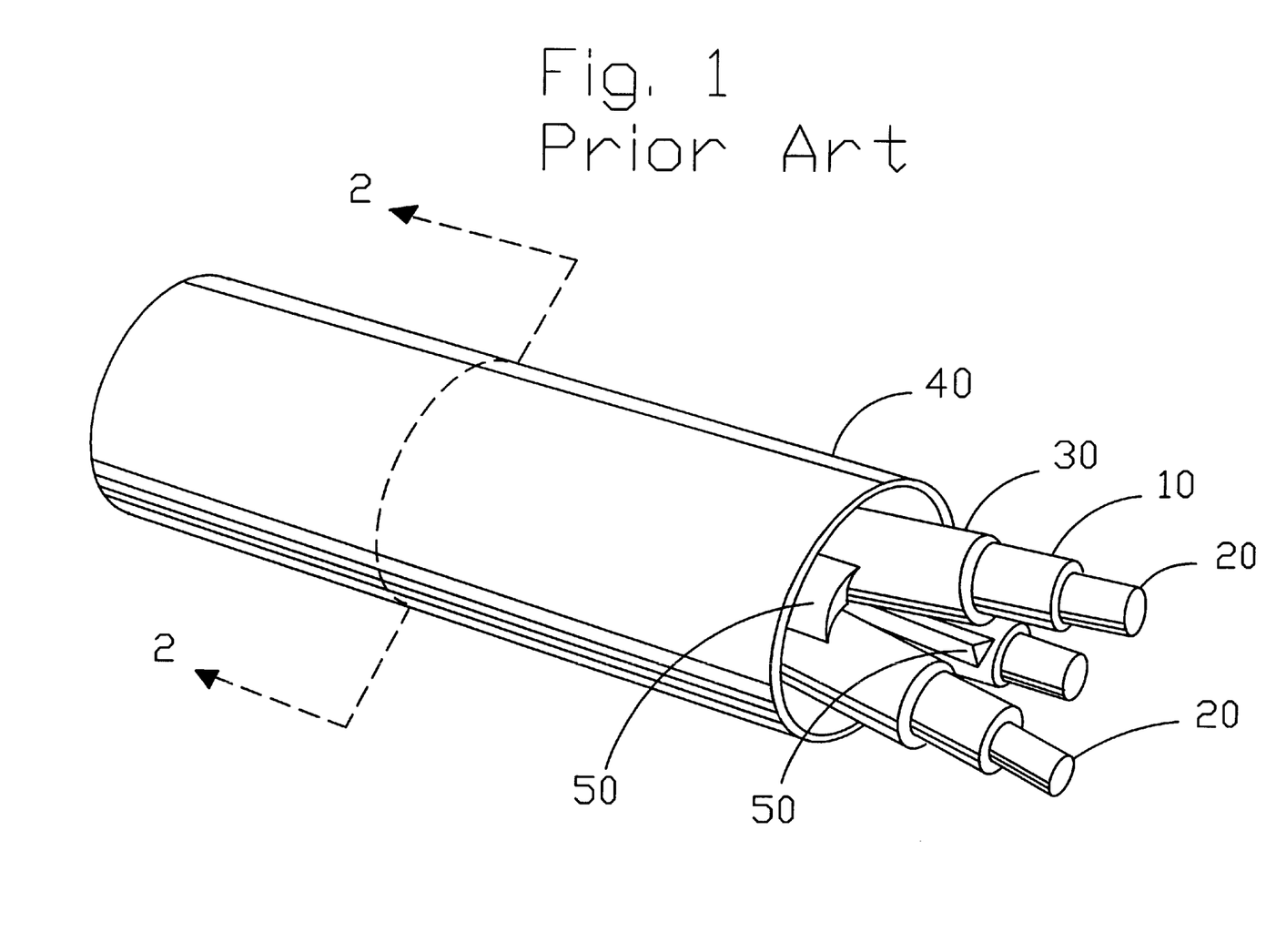
FIG. 1 is a cutaway view of a typical prior art three-phase (3-φ) alternating current electrical power cable.
Figure 2:
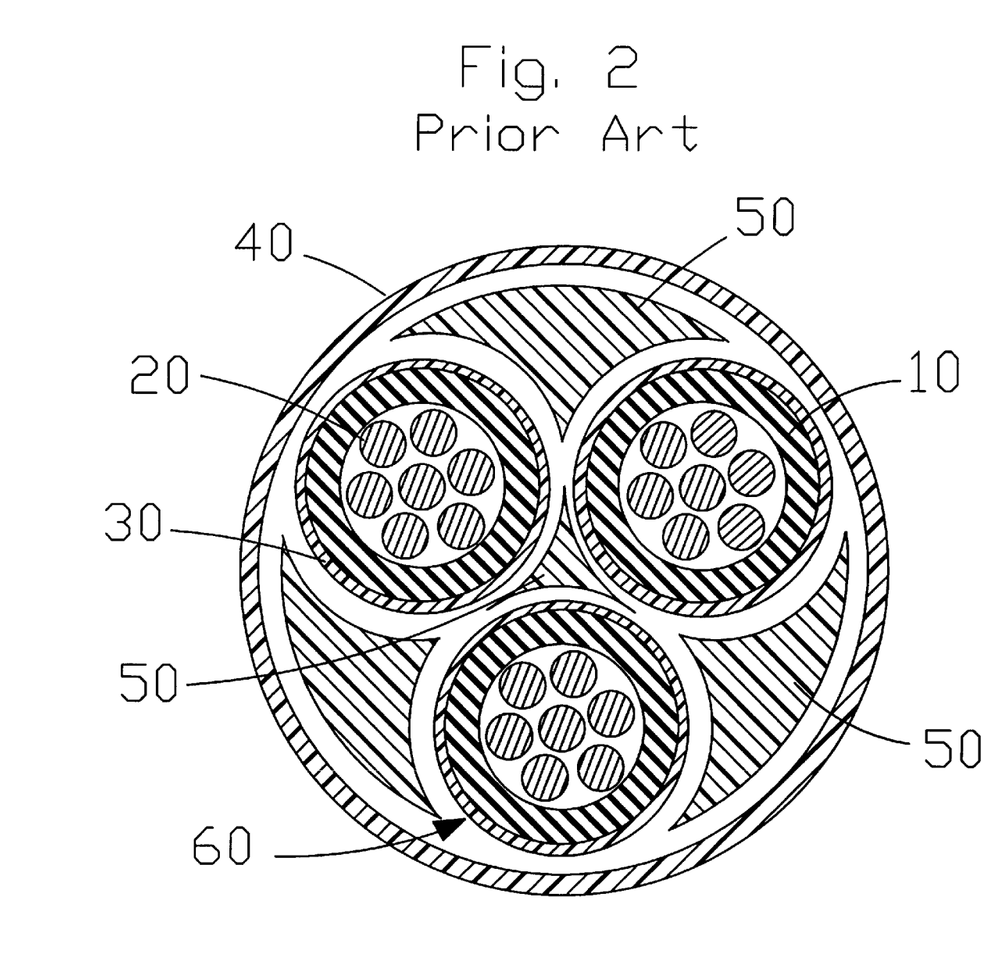
FIG. 2 is a crossection of the electrical cable of FIG. 1, taken along line 2—2.
Figure 3:
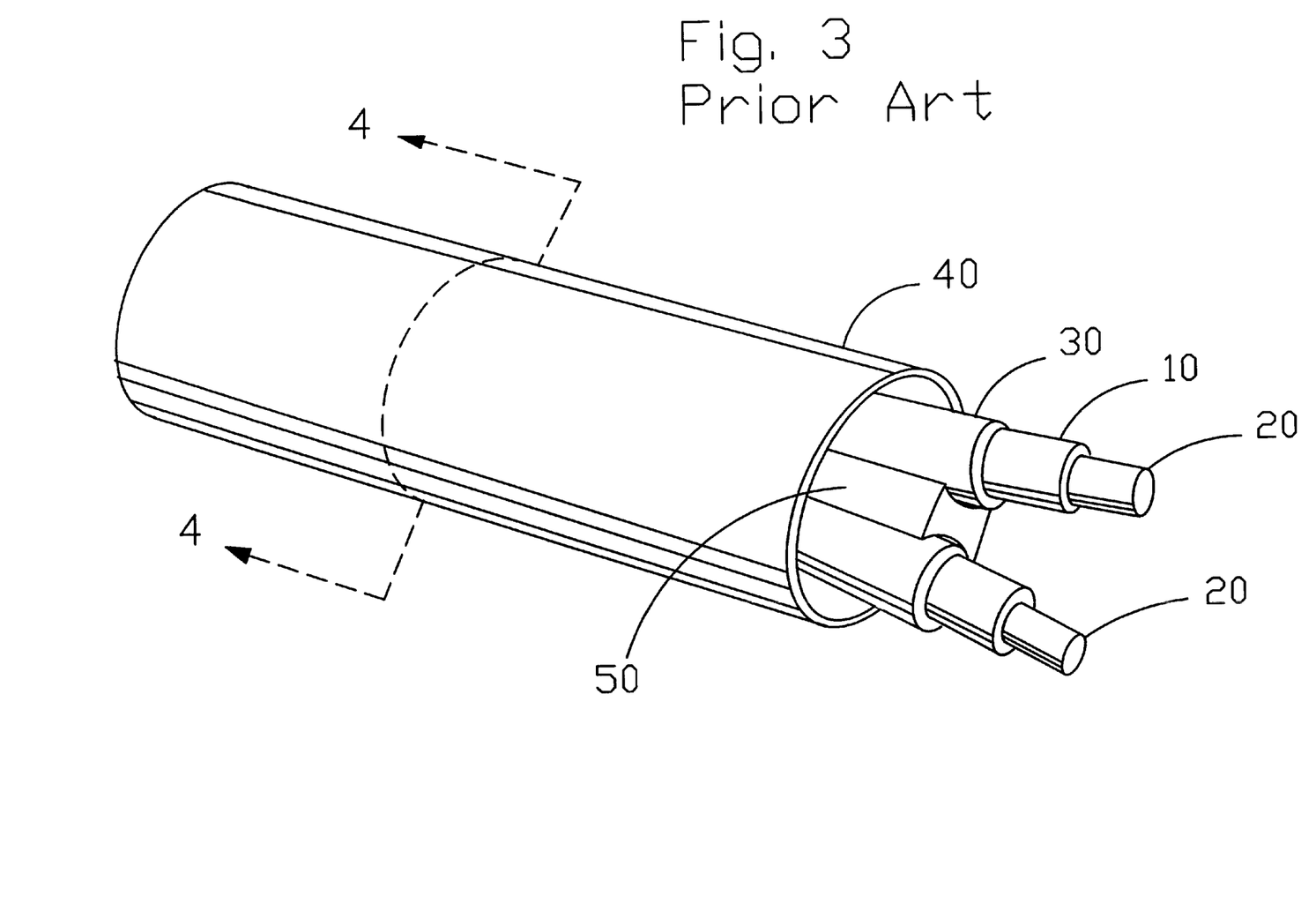
FIG. 3 is a cutaway view of a typical prior art two-conductor direct current electrical power cable.
Figure 4:
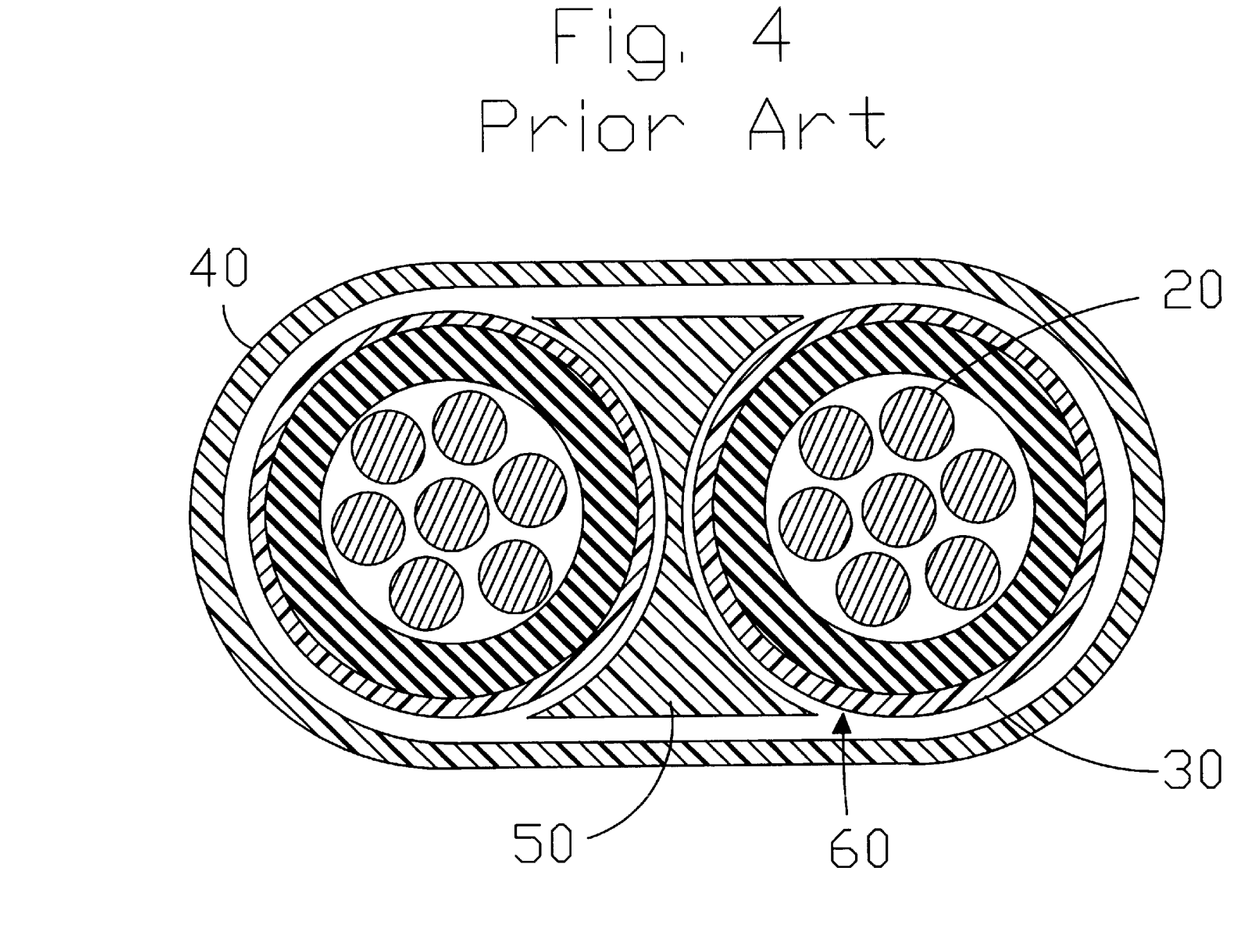
FIG. 4 is a crossection of the electrical cable of FIG. 3, taken along line 4—4.

Electrical cables come in a wide variety of voltage ranges and configurations, depending on their anticipated uses. Cables can be generally categorized based on voltage range (i.e., low-voltage, operating below about 1000 Vac or 250 Vdc, medium-voltage, operating between about 2 and 15 kVac, and high-voltage operating above 15-kVac) or function (i.e., power, control or instrumentation). Existing prior art low- and medium-voltage power and control cables such as that shown in FIGS. 1 through 4 are typically constructed using a polymer or rubber dielectric insulation 10 which is applied over a multi-strand copper or aluminum conductor 20. The insulation is often overlayed with a protective polymer jacket 30. In multi-conductor cables (such as those used in three-phase alternating current systems, as shown in FIGS. 1 and 2), a plurality of these individually insulated conductors are encased within a protective outer jacket 40 along with other components such as filler 50 and drain wires (not shown). These other components fulfill a variety of functions including imparting mechanical stability and rigidity to the cable, shielding against electromagnetic interference, and allowing for the dissipation of accumulated electrostatic charge. This general arrangement is used for its relatively low cost, ease of handling and installation, comparatively small physical dimensions, and protection against environmental stressors.

Current methods of evaluating electrical cable component aging generally may be categorized as electrical, physical, and microphysical. Electrical techniques involve the measurement of one or more electrical parameters relating to the operation of the cable, such as the breakdown voltage, power factor, capacitance, or electrical resistance of the dielectric. These methods have to the present been considered largely ineffective or impractical, in that they either do not show a good correlation between the parameter being measured and the aging of the dielectric, or are difficult to implement under normal operations. Furthermore, such techniques are often deleterious to the longevity of the insulation, and have difficulty determining localized aging within a given conductor.

Physical techniques including the measurement of compressive modulus, torsional modulus, or rigidity under bending often show a better correlation between the aging of the cable and the measured parameter (especially for low-voltage cable), and are more practical to apply during operational conditions. However, they generally suffer from a lack of access to the most critical elements of the cable, the individual electrical conductors and their insulation. For example, the measurement of compressive modulus by way of instruments such as the Indenter Polymer Aging Monitor are effective primarily with respect to the outer, accessible surface of the cable such as its outer jacket. Although correlations of the aging of the outer jacket to that of the underlying conductors have been attempted, these correlations are generally quite imprecise and are subject to a large degree of variability based on the specific configuration of the cable being tested (i.e., its materials of construction, insulation/jacket thickness, etc.), the presence of ohmically induced heating, shielding of the conductors against stressors by the outer jacket, and differences in the oxygen concentration at the conductor insulation versus that at the outer jacket. See EPRI TR-104075, "Evaluation of Cable Polymer Aging Through Indenter Testing of In-Plant and Laboratory Aged Specimens," prepared by the Electric Power Research Institute, January, 1996 for a discussion of the correlation between outer jacket and conductor physical measurements.

Other physical techniques such as the measurement of the tensile strength or elongation-at-break of the insulation material are inherently destructive and require a specimen of the aged cable for testing.

Another potential drawback to many of the physical techniques described above is disturbance of the bulk cable run during testing. In some applications, the dielectric of the cable being evaluated may be highly aged and embrittled, yet still completely functional. However, substantial movement of the cable (such as picking the cable up and clamping on a test device) may produce elongation stresses beyond those corresponding to the elongation-at-break for the insulation and/or jacket material, thereby inducing unwanted cracking of the insulation and/or jacketing and potential electrical failure.

Microphysical techniques such as the measurement of insulation oxidation induction time (OIT), density, gel or plasticizer content, or infrared absorption spectrum are generally quite accurate, yet require samples of the cable insulation and/or jacket for analysis. For jacketed conductors, such samples are generally only available at the ends of the cable where the conductors are terminated to a source or load, and not anywhere between. Furthermore, as with the physical techniques described above, the results of any such testing are necessarily applicable only to the localized area of the cable from which the specimen was taken, which may or may not be representative of the rest of the cable. Hence, one can either take a small sample of material from the outer jacket of the cable and attempt to extrapolate the results of the aging analysis to the underlying conductors, or alternatively take a sample at the ends of the conductor itself near its terminations and extrapolate these results to the rest of the unexposed conductor. Under either alternative, a substantial degree of uncertainty and imprecision exists. Plant operators are also generally reticent to allowing the removal of even small samples of material from their cables, especially in applications where plant safety and continuity of electrical power are critical.

Based on the foregoing, it would be most desirable to provide a cable construction which allows an operator to more accurately assess the aging of the underlying conductor insulation and jacketing of an in-situ cable (or optical conductor in the case of a fiber optic cable) in a completely non-destructive manner.

Similarly, it would be desirable to provide a method of monitoring and estimating the aging of internal cable components using the aforementioned cable construction in conjunction with aging measurement techniques and protocols.

SUMMARY OF THE INVENTION

The present invention satisfies the aforementioned needs by providing an improved cable and method of monitoring the aging of in-situ cable.

In a first aspect, the present invention provides an improved cable which allows for the non-destructive measurement of the aging of internal cable components through analysis of one or more in-situ specimens installed within one or more specially-constructed cavities located in the interior region of the cable.

In one preferred embodiment, an improved electrical cable is disclosed wherein specimens are fabricated from materials identical to the primary electrically loaded conductors within the cable, yet are removable from the interior of the cable without substantially disturbing the cable run or otherwise requiring destructive testing of any non-removable components thereof. Air flow may be allowed for within the interior region of the cable to provide the specimens with an atmosphere representative of that for the primary conductors. Distance markings may be provided on each of the specimens to permit the correlation of aging measurements to locations on the in-situ cable.

In a second aspect, the present invention provides a method of monitoring the aging and degradation of electrical and optical cables due to the effects of various aging stressors including heat and radiation through use of the specimen(s) contained within the improved cables described herein. In a first preferred method, a specimen is extracted from its respective cavity by affixing a lead to a first end of the specimen and drawing out the specimen. Aging measurement techniques are used in conjunction with the specimen to develop a spatial "aging profile" of the cable being analyzed.

DESCRIPTION OF THE PREFERRED EMBODIMENTS

Reference is now made to the drawings wherein like numerals refer to like parts throughout.

Figure 5:
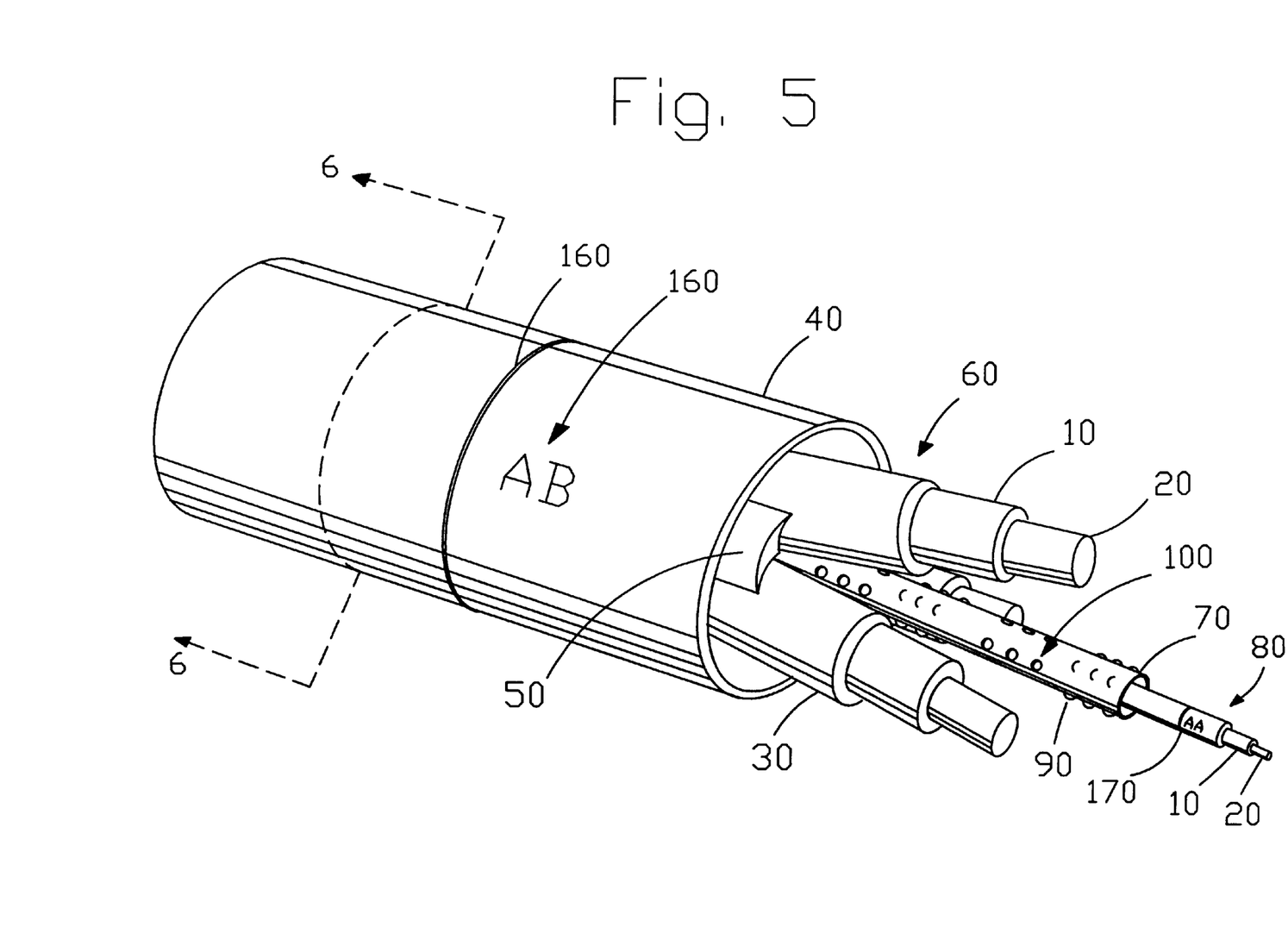
FIG. 5 is a cutaway view of a first preferred embodiment of an improved three-phase electrical cable manufactured according to the present invention.
Figure 6:
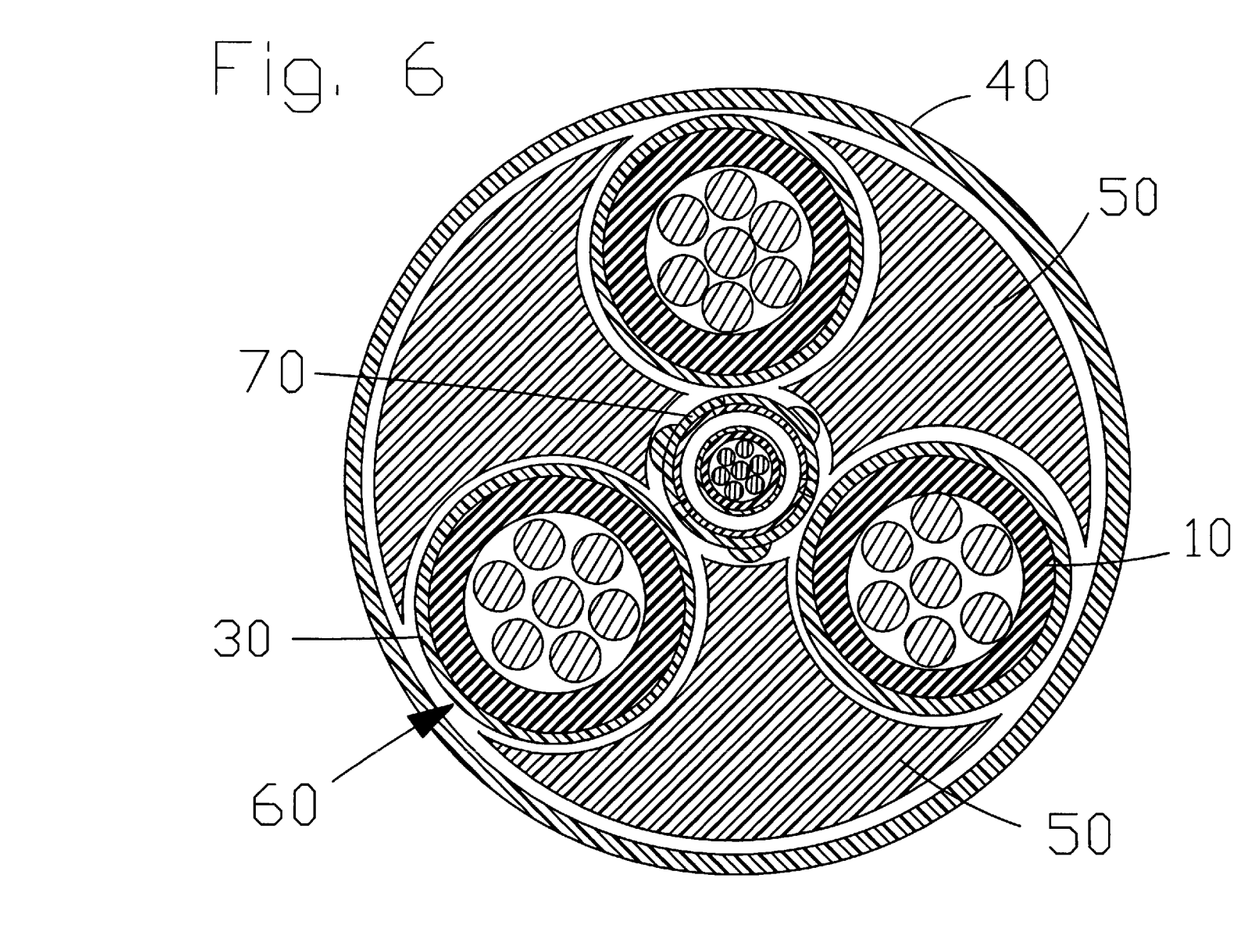
FIG. 6 is a crossection of the improved electrical cable of FIG. 5, taken along line 6—6.

FIGS. 5 and 6 show a first preferred embodiment of the improved electrical cable of the present invention. This embodiment represents a three-phase 600 Vac cable, although it can be appreciated that other cable constructions and voltage ranges may be used with equal success. Individual conductors 60 are encased collectively within outer jacket 40 along with a single central cavity tube 70 which is positioned at roughly the geometric center of the cable crossection in this embodiment. The conductors 60 may be installed in a rope-lay, straight-lay, or other fashion within the jacket and around the cavity tube 70, depending on the type of cable and its intended uses. One or more elements 80 are installed within the interior region of the cavity tube 70 in a longitudinal fashion. These elements 80 are preferably cable-type specimens constructed similar to an individual conductor 60 so as to closely parallel the aging properties of the conductors, although other constructions may be used. The "specimen" elements 80 are substantially undersized in overall diameter as compared to the inside diameter of the cavity tube 70 so to fit easily within the interior region of the cavity tube without binding during element removal and retraction, regardless of cable position. As shown in FIG. 5, the outer surface of the cavity tube 70 is regularly punctuated with rows of small protrusions (retention elements) 90 which contact the adjacent individual conductors 60 so as to limit any relative longitudinal movement of the cavity tube 70 with respect to the conductors 60 when the specimen elements 80 are inserted or removed. Furthermore, the thickness of the cavity tube 70 is perforated with a series of small holes 100 which permit communication between the atmosphere present at the inner and outer regions of the cavity tube. Such communication of the internal atmosphere of the cable is primarily for the purpose of establishing a consistent atmosphere for both the specimen elements 80 and the individual conductors 60.

Description of Cavity Tube

Figure 7:
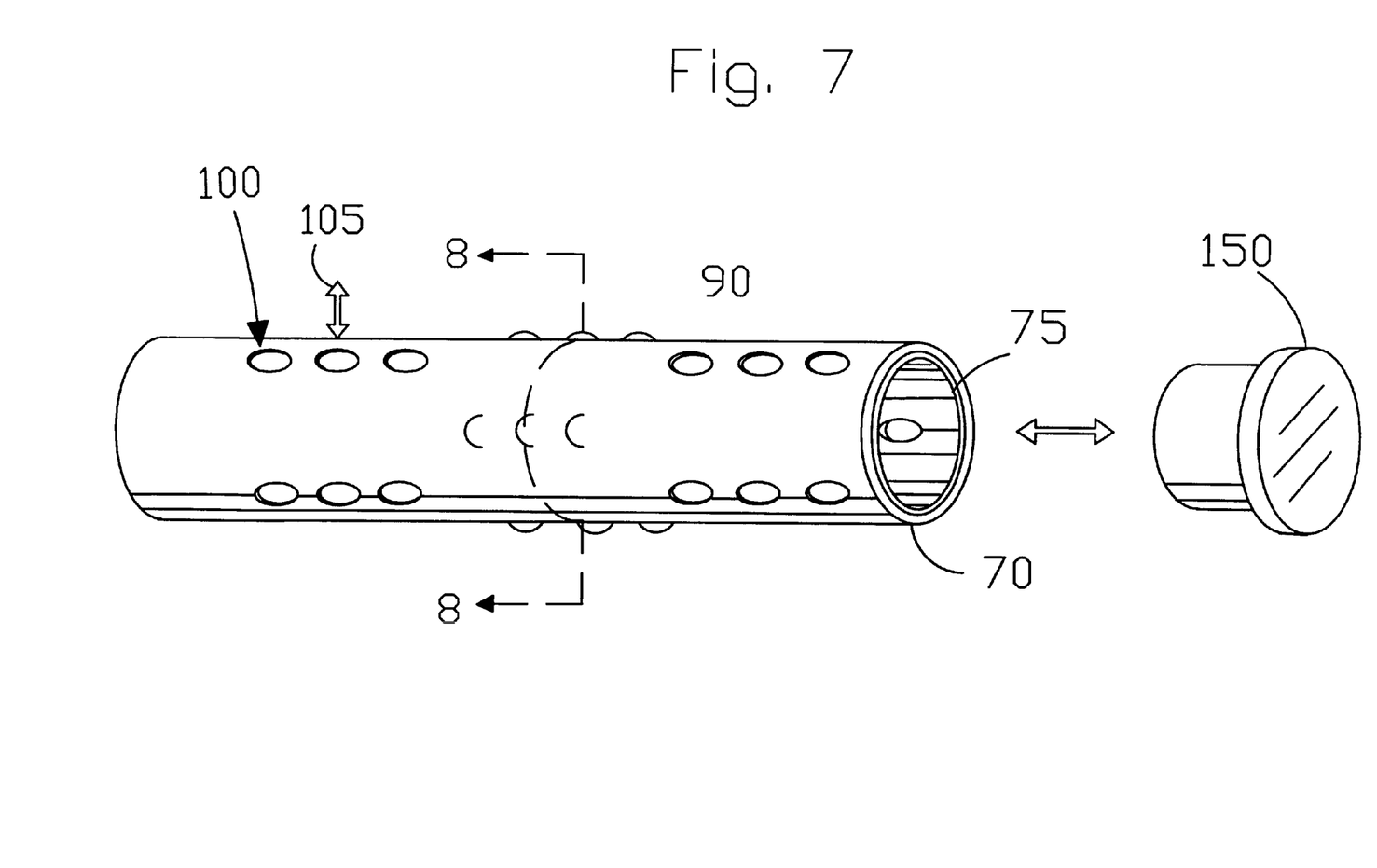
FIG. 7 is cutaway view of one of the specimen guide tubes of the present invention, with no specimen installed.
Figure 8:
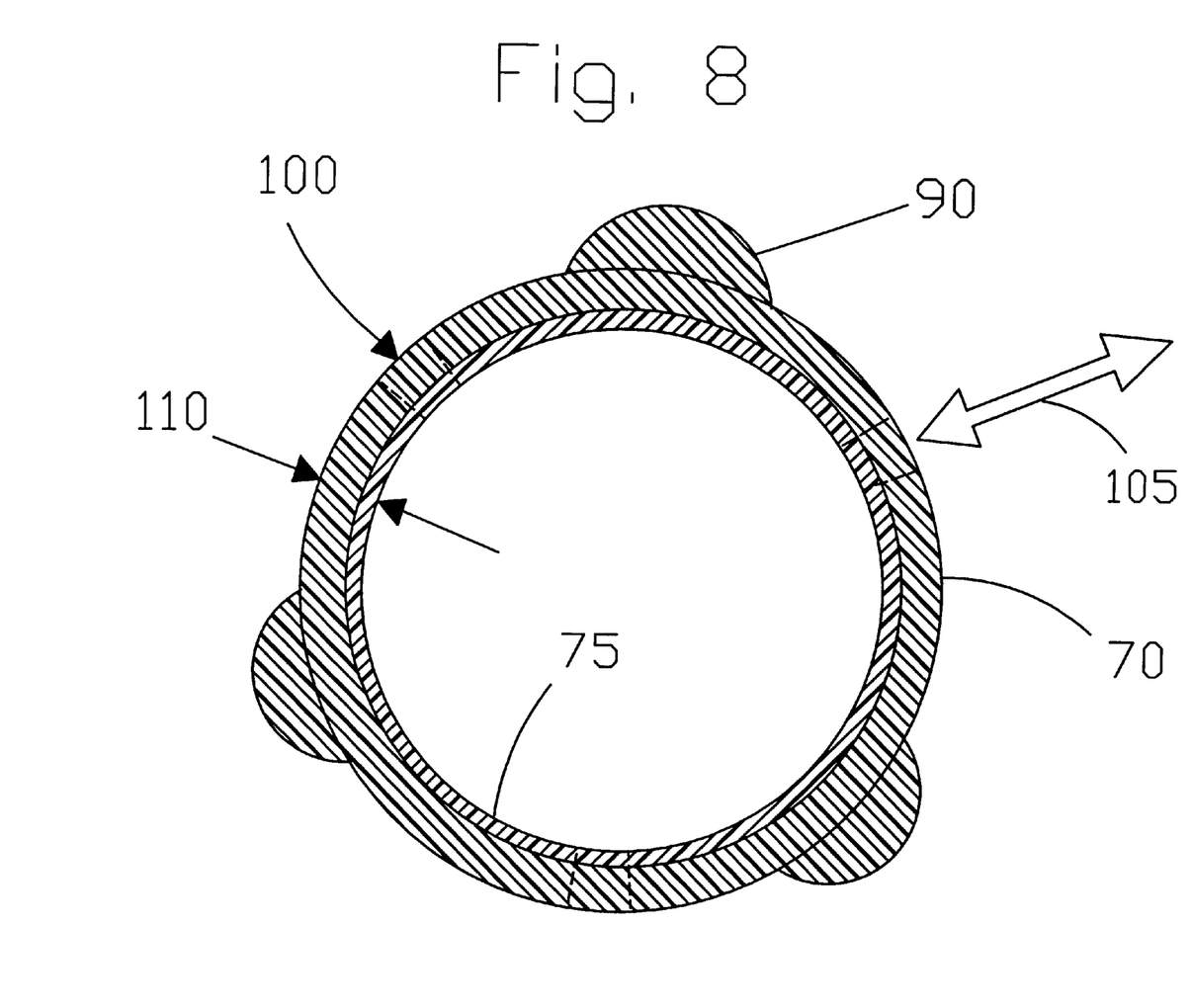
FIG. 8 is a crossectional view of the specimen cavity guide tube of FIG. 7, taken along line 8—8.

Reference is now made to FIGS. 7 and 8. The diameter of the cavity tube 70 is chosen to provide sufficient tube rigidity and flexibility (as described in detail below) while allowing for the insertion of one or more specimen elements 80 of sufficient size. Generally speaking, as the similarity between the specimen elements 80 and the individual conductors 60 decreases, the uncertainty associated with the aging estimate increases. In some cases, it may be ideal to utilize specimen elements of size and construction comparable to that of the individual conductors so as to remove as much uncertainty as possible from the conductor aging estimates derived from the specimens. However, spatial and weight considerations may preclude the inclusion of a full-sized conductor; hence, the size and construction of the specimens 80 and cavity tube 70 may be varied as required to accommodate the needs of the individual user. In the embodiment described above, the addition of a centrally located cavity tube of equal diameter to the three existing conductors increases the overall cross-sectional diameter of the cable by roughly half and overall cable weight per length by roughly one-third; progressively smaller increases in cable diameter and weight can therefore be achieved through use of increasingly smaller diameter cavity tubes. Note, however, that there is a practical lower limit to the diameter of the cavity tube 70 and specimen elements 80.

The cavity tube thickness 110 and material of construction is chosen so as to permit sufficient flexibility of the tube during cable bending (such as occurs during installation), yet sufficient rigidity so as to prevent collapse of the tube due to transverse or compressive forces. Collapse of the cavity tube 70 could preclude the insertion and/or withdrawal of the specimen elements 80. Furthermore, the tensile strength of the cavity tube 70 should be considered in light of pulling forces which may be applied to the cable during installation. Electric Power Research Institute (EPRI) Publications EL-5036, EL-3333 and various Institute of Electrical and Electronics Engineers (IEEE) standards describe acceptable installation practices for cables.

Preferred materials for the cavity tube include flouropolymers (such as ethylene tetraflouroethylene (ETFE) or flourinated ethylene propylene (FEP), commercially marketed under the tradenames of Tefzel™ and Teflon™, respectively, by Dupont de Nemours Company) or polyethylene, although it can be appreciated that a wide variety of other materials may be used alone or in combination with equal success. Flouroploymers generally provide extreme resistance to a broad range of chemical agents as well as excellent mechanical and dielectric properties. Additionally, flouropolymers provide a smooth, low-friction inner surface 75 for the cavity tube 70 to facilitate insertion and removal of the specimen elements 80. The material chosen should also be able to withstand any extremes of temperature associated with the cable manufacturing process without significant deformation or change in physical properties.

The thickness 110 of the cavity tube 70 may vary widely and depends on, inter alia, the size of the electrical conductors in the cable (e.g., AWG of conductors), the cavity tube material chosen and its physical properties, the severity of the cabling process and any residual stresses resulting therefrom, and the diameter of the cavity tube 70. Generally speaking, a tube thickness on the order of one-half to three millimeters (0.5 to 3.0 mm) should be sufficient for most applications utilizing one of the aforementioned polymers. Too thick a cavity tube may make the assembled cable overly rigid and resistant to bending.

To aid in the periodic removal and insertion of the specimen elements 80, a coating or lubricant may be used on the interior surface 75 of the cavity tube 70. As previously described, flouropolymers tend to provide a low-friction surface by their nature. Lubricants which will not detrimentally affect the specimen elements 80 or individual conductors 60, such as graphite powder or talc, may also be used, as may other substances which are suited to the particular application.

As is well understood, the presence of oxygen and other gases may significantly affect the aging of cable components. As previously described, a series of perforations or holes 100 in the cavity tube 70 permit air to interchange between the inner and outer regions of the tube as shown by arrow 105. If a significant concentration of oxygen were admitted to the interior of the cavity tube, the aging of the conductors positioned adjacent to the outer region of the tube (as well as any specimens 80 contained within the tube) may be accelerated as compared to a prior art cable used in the same application and experiencing the same stressors. Accordingly, end caps 150 are used at both ends of the cavity tube to limit the ingress of unwanted oxygen and other gases into the tube during operation, or prevent the transferral of the atmosphere at one end of the cable to the other end (such as for maintaining primary containment integrity in nuclear reactor plants). These end caps may be fashioned from most any material which provides adequate sealing against the cavity tube. Elastomers or polymers, such as ethylene propylene rubber or similar, are preferred due to their desirable physical properties. Prior to cable termination, the specimen elements 80 are cut if required and retracted completely into the cavity tube 70 and the end caps 150 installed, as shown in FIG. 7. It should be further noted that cable severance occurs only at discrete points along the length of the cable corresponding to those locations where the cavity tube holes 100 do not exist (see discussion of marking below). In this fashion, air is effectively precluded from entering the cavity tube via the holes 100 during normal operation.

It can also be appreciated that the cavity tubes may have other utility. For example, other cable aging or condition monitoring techniques such as preionized gas could be employed via the cavity tube. Alternatively, the specimen elements 80 may be replaced or used in conjunction with fiberoptic conductors, instrumentation, nuclear accident monitoring equipment, or a variety of other alternative devices.

Description of Specimen Elements

Figure 9:
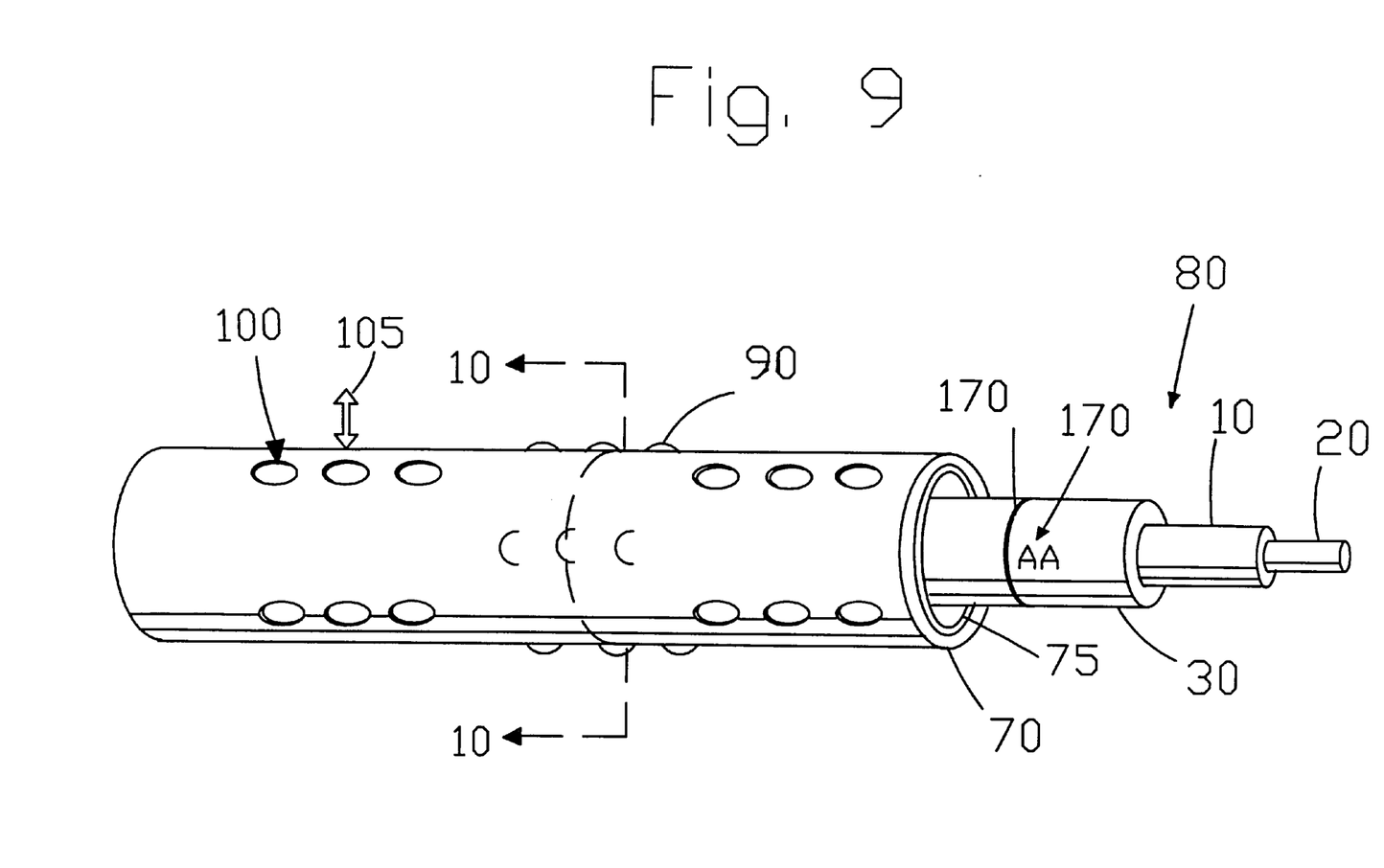
FIG. 9 is cutaway view of one of the specimen cavity guide tubes of the present invention, with a single specimen installed.
Figure 10:
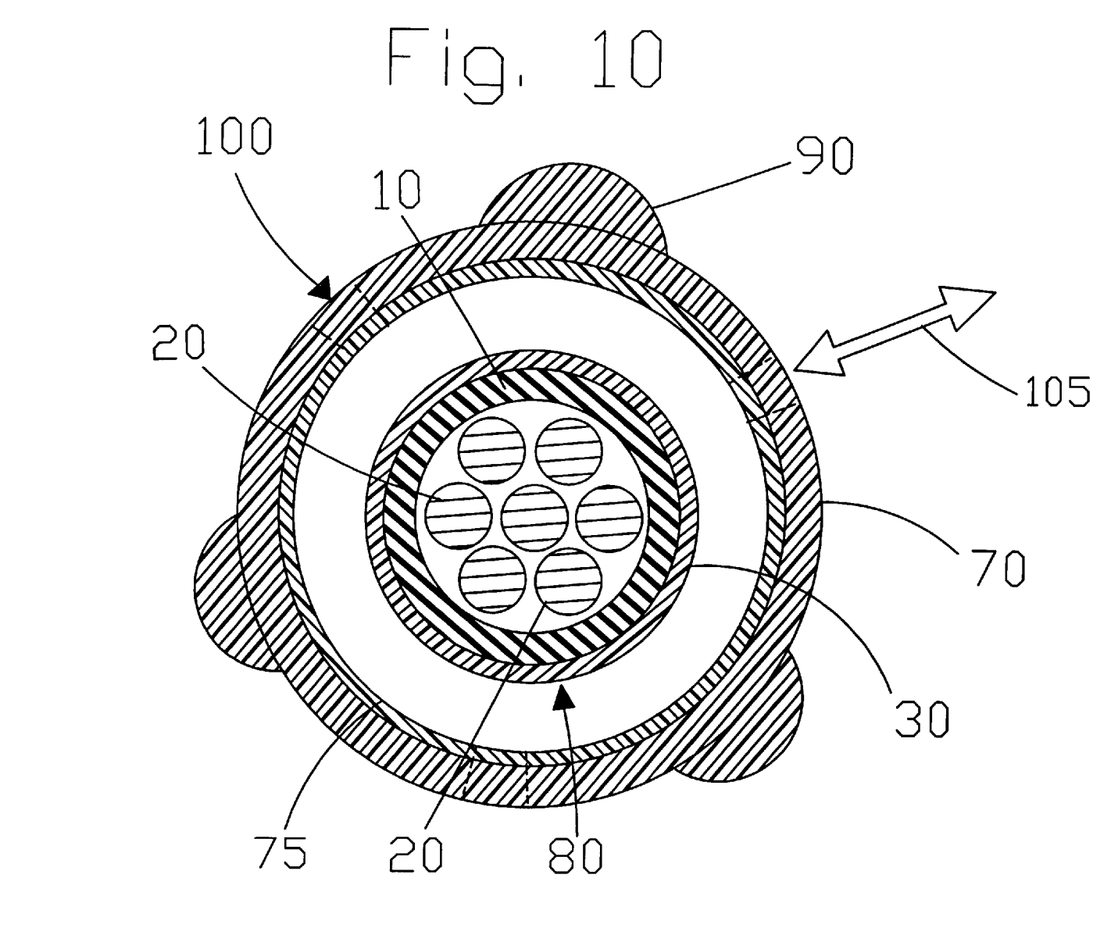
FIG. 10 is a crossectional view of the specimen cavity guide tube of FIG. 9, taken along line 10—10.

Reference is now made to FIGS. 9 and 10. The specimen elements 80 of the present embodiment may consist of a conductor, insulation, and jacket (if required) so as to be similar to the individual conductors 60 of the cable. In the present embodiment, the specimen elements 80 are made nearly identical to the individual conductors 60 so as to maintain the maximum degree of consistency between the two for purposes of aging correlation. This arrangement has the further advantage of reducing fabrication cost through the use of an existing, off-the-shelf insulated conductor as opposed to one specially designed for this application. It can be appreciated, however, that a wide variety of alternate configurations and materials may be used in the construction of the specimen elements, depending on the needs of the individual user. For example, specimen elements of much smaller diameter yet identical materials may be used.

Alternatively, specimen elements of limited length as compared to the individual conductors or having no outer jacket may be employed as well. In fiberoptic applications, the specimen element may simply be one or more optical fibers.

Specimen element insulation and jacket materials may include any one of a variety of polymers such as ethylene propylene rubber (EPR), chlorosulfonated polyethylene (CSPE, tradename Hypalon™), crosslinked polyethylene (XLPE), polyvinylchloride (PVC), or neoprene rubber. These materials are generally chosen to be consistent with those chosen for the individual conductors 60, as previously described.

Figure 9A:
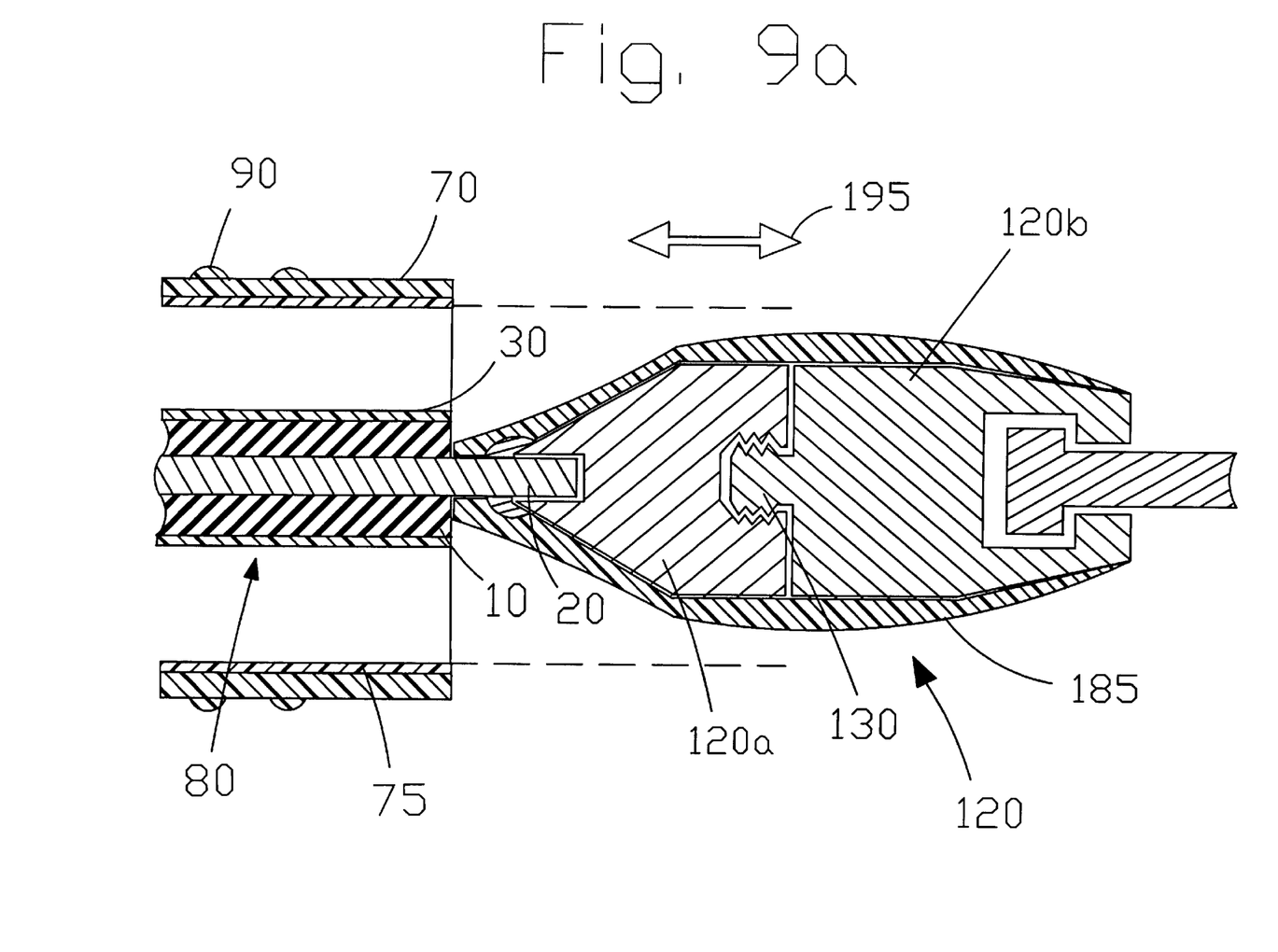
FIG. 9a is a crossectional view of the specimen element of FIG. 9 with retractor coupling installed.

The specimen element conductor 20 may be used to facilitate the insertion and retraction of each specimen element 80 in relation to the cavity tube 70. This can be accomplished by soldering, brazing, crimping, or otherwise affixing a retraction coupling 120 to each of the ends of the conductor 20 after the installation of the cable, as shown in the embodiment of FIG. 9a. For fiberoptic conductors, epoxy of that well known in the telecommunications arts may be used to bond the optical fiber to the coupling 120. The coupling components 120a, 120b are sized and shaped so as to fit easily down the cavity tube 70 during specimen retraction. Furthermore, each coupling 120 may be covered by a soft polymer coating or heatshrink sleeve 185 (such as that manufactured by Raychem Corporation for use in environmentally qualified nuclear plant applications) to prevent damage to the inside surfaces 75 of the cavity tube 70. Each coupling 120 is preferably metallic, although other materials may be suitable. Each coupling 120 may further be provided with a threaded fastener 130 or any other means of connection to a device such as a reel or spool, which can be used to remove the specimen element 80 from the cavity tube 70 for inspection or analysis as shown by arrow 195 and later retract the specimen into the cavity tube via the coupling at the other end.

Each specimen element is further marked in accordance with the marking system described below to facilitate localized analysis of various portions of the cable along its length.

Description of Cable/Specimen Marking System

As shown in FIGS. 5 and 9, a marking system is used to assist in performing more accurate aging assessments of localized regions of the cable, as well as realignment of the specimen elements 80 during retraction back into the cavity tube 70. The system consists of a series of regular and periodic markings 160 on the outer jacket 40 of the cable which coincide with identical markings 170 on each of the specimen elements 80 therein. The markings may be comprised of a series of alphabetic and/or numeric characters progressing in a logical sequence down the cable length from source to load, although other arrangements and characters may be used with equal success. For example, the first marking nearest the source termination may be "AA", the next "AB", and so forth. Such markings may be applied in any desired manner such as printing, painting, banding, or any other means suited to the particular application.

Specimen elements withdrawn from the cable can therefore be analyzed at specific locations of interest without having to measure down the length of the cable, a task which is often impractical or impossible due to physical limitations such as interposed bulkheads or electrical penetration assemblies. For example, a plant operator may wish to evaluate the condition of individual cable conductors exposed to a localized heat source residing near marking point "XX" on the cable. The operator may then simply retract the specimen as described below until he/she observes the "XX" marking on the specimen element, and subsequently perform the necessary evaluation.

Furthermore, since the holes 100 in the cavity tube 70 are spaced so as not to coincide with the markings on the cable jacket, the markings provide a ready indication of where the cable must be severed during installation or splicing.

Description of Other Embodiments

Figure 11:
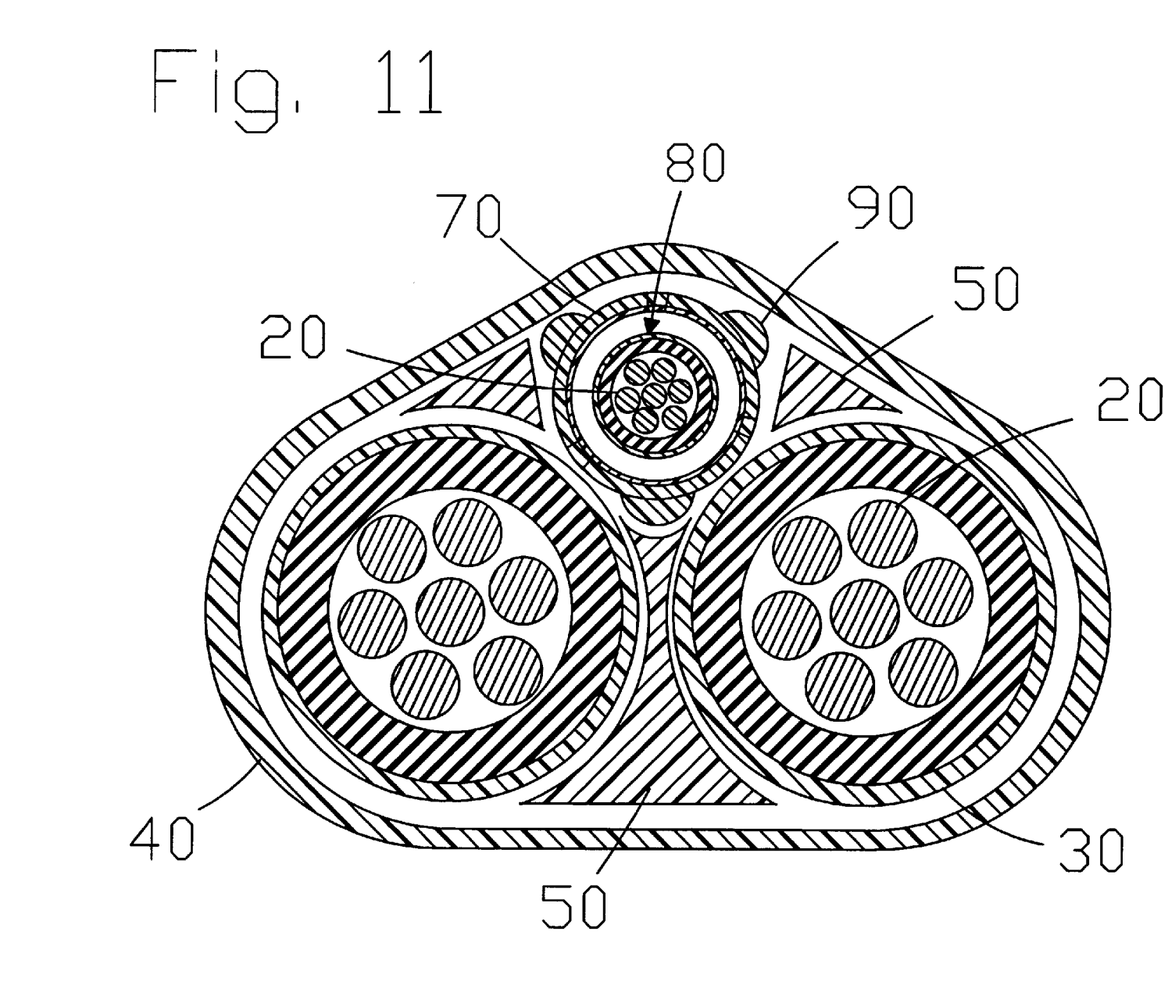
FIG. 11 is a crossectional view of a second preferred embodiment of an improved two-conductor electrical cable manufactured according to the present invention.
Figure 12:
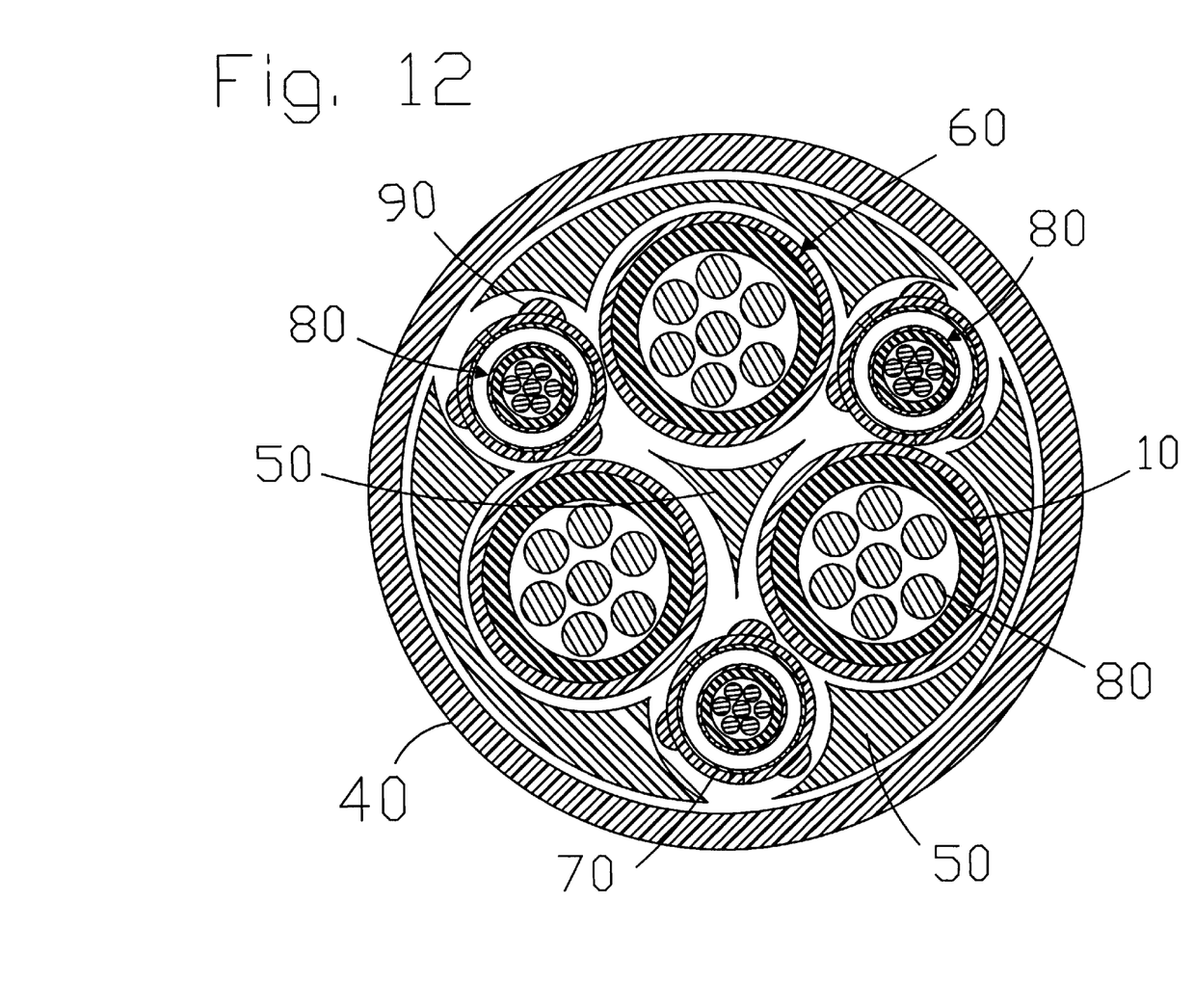
FIG. 12 is a crossectional view of a third preferred embodiment of an improved three-phase electrical cable manufactured according to the present invention.

FIGS. 11 and 12 show alternate embodiments of the present invention.

FIG. 11 shows a two-conductor electrical cable as is typically used in direct current (DC) applications. In this embodiment, the cavity tube 70 is disposed between (yet off center from) both conductors; however, it can be appreciated that the cavity tube and specimen element can be placed in any location relative to the individual conductors 60 (including directly between) depending on the spacial requirements of the intended application.

FIG. 12 shows a three-conductor electrical AC cable having a plurality of cavity tubes and specimen elements. In this embodiment, the cavity tubes 70 are disposed in the outer interstices between the individual conductors 60, as opposed to in the central region of the cable as in the first embodiment of FIG. 5. Placement of the specimens in these locations provides somewhat improved accuracy of the aging correlation between specimen(s) and conductor(s) as compared to the first embodiment, in that less "shielding" of the specimens by the conductors from incident heat or radiation occurs.

Method of Monitoring Cable Aging

In accordance with the present invention, a method of monitoring the aging of electrical and optical cables is described herein.

In the most basic case, the specimen element(s) 80 may be removed from the cable for analysis at one time in the cable's installed lifetime, and not reinstalled. In this fashion, a "snapshot" of the cable condition maybe obtained at this one point in time, and an estimate of the level of aging of the installed conductors 60 developed. Such a method may be of use in applications which are not critical to plant safety or continuity of power/production. The specimen elements 80 are withdrawn via the coupling 120 installed at the end of each element, as previously described.

Alternatively, the specimen element(s) may be periodically drawn out of the cable, analyzed, and then retracted back into their respective cavity tube 70 for further aging. Using this method, a series of aging snapshots are taken which may then be used to develop an aging profile for the analyzed specimen element(s); this aging profile can then be used to estimate the current level of aging of the installed individual conductors 60 as well as more accurately predicting the rate of conductor aging. This increased level of scrutiny may be warranted for cables used in more critical applications, or those in "worst case" aging environments as described below.

For medium-voltage electrical cable applications where electrical aging stressors are of increased concern, the specimen elements 80 may be periodically or continuously energized at voltage levels comparable to those applied to the individual conductors 60 of the cable. To facilitate such energization, special end caps 150 as shown in FIG. 7 allow the conductor 20 of the specimen element 80 to penetrate the cap 150 so that the conductor may be energized by any conventional means.

Thermal and/or dosimetric instrumentation may also be installed in the cavity tube as desired to measure the integrated thermal exposure and radiation dose, respectively, experienced by the specimen in the cavity tube. Such information can then be used to develop estimates of individual conductor aging based on existing material aging data or analysis techniques (such as the well known Arrhenius model).

It should also be recognized that cables manufactured according to the present invention ("instrumented cables") may be used sporadically so as to minimize the effects of any size and/or weight increase associated with their use. For example, to monitor the aging of a plurality of cables contained in a cable tray passing through a given high-temperature space, a single instrumented cable may be used to provide estimates for all similarly situated and constructed cables. Similarly, a "worst case" application may be identified and an instrumented cable installed; periodic monitoring of the instrumented cable helps operators infer that the aging of other similar cables in less severe environments is no greater than that for the worst-case cable. In this manner, the periodic monitoring of a limited number of instrumented cables can provide a plant operator with substantial assurance of the integrity and longevity of all cables within his/her plant.

While the above detailed description has shown, described, and pointed out the fundamental novel features of the invention as applied to various embodiments, it will be understood that various omissions, substitutions, and changes in the form and details of the device or process illustrated may be made by those skilled in the art without departing from the spirit of the invention.

What is claimed is:

1. A cable, comprising;
   at least one conductive element;
   a substantially flexible cavity tube disposed in relative proximity to said at least one conductive element, said cavity tube having a plurality of retention elements for retaining said cavity tube in a position relative to said at least one conductive element; and
   at least one specimen element having a diameter smaller than that of said cavity tube, said at least one specimen element being disposed substantially within said cavity tube, at least a portion of said at least one specimen element being removable from said cavity tube.

2. The cable of claim 1, wherein said at least one conductive element is electrically conductive.

3. The cable of claim 1, wherein said at least one conductive element is optically conductive.

4. The cable of claim 1, wherein said at least one cavity tube and said conductive element are substantially encased within an outer covering.

5. The cable of claim 1, wherein said at least one specimen element is an insulated electrical conductor.

6. The cable of claim 1, wherein said at least one specimen element is an optical fiber.

7. The cable of claim 1, wherein said cavity tube further comprises a plurality of perforations through its thickness.

8. The cable of claim 1, wherein said at least one specimen element is shorter in total length than said cable.

9. A cable, comprising;
   a conductive element;
   a substantially flexible cavity tube having a recess formed therein, and a plurality of retention elements disposed thereon, said cavity tube disposed in relative proximity to said conductive element, said recess adapted to receive at least one specimen element which is removable from said cavity tube.

10. The cable of claim 9, wherein said conductive element is electrically conductive.

11. The cable of claim 9, wherein said conductive element is optically conductive.

12. The cable of claim 9, wherein said retention elements comprise a plurality of raised features disposed on an outer surface of said cavity tube.

13. The cable of claim 9, wherein said at least one specimen element is an insulated electrical conductor.

14. The cable of claim 9, wherein said at least one specimin element is an optical conductor.

15. A cable, comprising:
    a conductive element;
    a substantially flexible cavity tube having an internal recess formed therein, and a plurality of raised retention elements disposed thereon, said cavity tube being disposed in relative proximity to said conductive element; and
    a specimen element disposed substantially within said internal recess, said specimen element being shorter in total length than said cable and sized with respect to said cavity tube so as to be at least partly removable from said recess.

\* \* \* \* \*